(12) United States Patent
Dickinson (10) Patent No.: US 7,252,769 B2
(45) Date of Patent: Aug. 7, 2007

(54) USE OF CERIUM SALTS TO INHIBIT MANGANESE DEPOSITION IN WATER SYSTEMS

(75) Inventor: Wayne H. Dickinson, Olive Branch, MS (US)

(73) Assignee: Buckman Laboratories International, Inc., Memphis, TN (US)

(*) Notice: Subject to any disclaimer, the term of this patent is extended or adjusted under 35 U.S.C. 154(b) by 305 days.

(21) Appl. No.: 10/945,398

(22) Filed: Sep. 20, 2004

(65) Prior Publication Data
US 2005/0061753 A1    Mar. 24, 2005

Related U.S. Application Data

(60) Provisional application No. 60/504,855, filed on Sep. 22, 2003.

(51) Int. Cl.
*C02F 5/08* (2006.01)

(52) U.S. Cl. .............. 210/699; 210/696; 210/698; 252/181; 422/15; 422/19

(58) Field of Classification Search .............. 210/696
See application file for complete search history.

(56) References Cited

U.S. PATENT DOCUMENTS

| | | | |
|---|---|---|---|
| 3,733,270 A | 5/1973 | Kerst | 210/58 |
| 4,501,667 A | 2/1985 | Cook | 210/700 |
| 4,606,890 A * | 8/1986 | Fisk | 422/15 |
| 4,900,451 A * | 2/1990 | Brown et al. | 210/699 |
| 5,130,052 A * | 7/1992 | Kreh et al. | 252/387 |
| 6,180,056 B1 | 1/2001 | NcNeed et al. | 422/15 |
| 6,767,927 B1 * | 7/2004 | Yunlu et al. | 516/33 |
| 7,041,628 B2 * | 5/2006 | Sunder et al. | 510/223 |

FOREIGN PATENT DOCUMENTS

WO    WO 02/49960 A2    6/2002

OTHER PUBLICATIONS

Corrosion/2002, Advance Program, p. A83, (Nov. 2001).
Corrosion/2002, Final Program, (2002) 02444.
NACE International Webpage—Corrosion/2002—Abstract 02444 (2002).
E-mail dated Jul. 30, 2001 regarding Corrosion 2002—Abstract.
Dickinson et al. "Manganese-Dependent Corrosion in the Electrix Utility Industry," *Corrosion/2002 Annual Conference and Exhibition*, Denver, CO., Paper No. 02444, Apr. 2002.
International Preliminary Report on Patentability for PCT/US2004/030661 dated Apr. 6, 2006.

* cited by examiner

Primary Examiner—Peter A. Hruskoci
(74) Attorney, Agent, or Firm—Kilyk & Bowersox P.L.L.C.

(57) ABSTRACT

Methods to control manganese deposition in an aqueous system, which include introducing a cerium-containing composition, and optionally another deposit control agent, to the aqueous system, are described. Also described, are cerium-containing compositions that promote the manganese stabilization performance of polymeric dispersants and phosphonic acids commonly used in water treatment applications. Cerium-containing compositions that can inhibit the oxidative degradation of deposit control agents are also described.

16 Claims, 3 Drawing Sheets

USE OF CERIUM SALTS TO INHIBIT MANGANESE DEPOSITION IN WATER SYSTEMS

This application claims the benefit under 35 U.S.C. §119 (e) of prior U.S. Provisional Patent Application No. 60/504,855 filed Sep. 22, 2003, which is incorporated in its entirety by reference herein.

BACKGROUND OF THE INVENTION

The present invention relates to certain compositions and processes useful for minimizing fouling by manganese deposition in aqueous systems. More particularly, the present invention relates to deposit control agents and chemical water treatments adapted to stabilize manganese against oxidation.

Fouling by manganese deposition in pipelines and waterworks has been a concern for some time and it continues to impact water supplies today. Manganese deposition in cooling water circuits degrades corrosion resistance, lowers heat exchanger efficiency, and reduces biocide performance. The detrimental effects of manganese deposition inflict significant costs to the electric power industry through increased fuel consumption, more frequent and extensive clean-ups, higher chemical treatment costs, and in some cases, significant capital costs for component replacement. In addition to cooling water circuits, manganese deposition may occur in a variety of other aqueous systems including drinking water distribution systems, sewage treatment plants, swimming pools, laundries, bottling plants, air scrubbers, and car washes. Problems range from corrosion and blockage of pipes and nozzles, to staining, discoloration, and inferior taste. The adherent and oftentimes coarse deposits that form from manganese deposition can adversely affect heat transfer, induce abrasive wear, and reduce pumping efficiency. Removal of manganese deposits often requires aggressive remedial techniques, such acid leaching and mechanical cleaning.

In water systems, manganese promotes pitting and crevice corrosion through a combination of electrochemical effects caused by galvanic coupling between manganese deposits and the underlying metallic surface. The effect of the galvanic action is to shift the metal corrosion potential in the positive or noble direction fostering passive film breakdown and localized corrosion. The effect is most severe for stainless steels, but also occurs on brass and other copper alloys. Regions in the U.S. where stainless steel or copper alloy corrosion has been linked to manganese deposition include Northern Virginia, the Ohio River Valley, central Maine, eastern Nebraska, S.C., and the Gulf Coast region.

Concerns over manganese fouling are typically less than concerns related to calcium, silica, or iron due to the often low or undetectable levels of manganese in the majority of commercial and residential water supplies. Many surface and groundwaters nevertheless have manganese levels that pose a significant fouling threat. Corrosion and other adverse effects of manganese deposition in systems serviced by such water can lead to equipment repair and replacement expenses that far exceed costs associated with the more prevalent mineral scalants.

Deposition of manganese in oxic, neutral-to-alkaline waters is caused by the oxidation of soluble divalent manganese into water-insoluble manganese oxides and oxyhydroxides. The insoluble, higher valent manganese compounds are loosely grouped and referred to simply as manganese dioxide or $MnO_2$. $MnO_2$ can form when manganese-containing water is exposed to halogens, ozone, or other chemical oxidants that are commonly used for disinfection purposes in water systems. Alternatively, $MnO_2$ can be produced by a wide range of microorganisms that grow naturally in surface and in groundwaters worldwide. Microbial reactions scavenge manganese in a highly efficient manner, enabling waters containing as little as 20 ppb dissolved manganese to deposit visible $MnO_2$ deposits within as little as a few days' time.

Methods to control manganese deposition can be categorized as either 1) manganese removal or 2) manganese stabilization. Dissolved manganese is typically removed from water supplies by chemical oxidation followed by filtration. The oxidation/filtration approach uses permanganate, chlorine dioxide, chlorine, ozone or other oxidants to convert soluble manganese into insoluble $MnO_2$, followed by settling or filtration of the solid material. Chemical oxidation is highly effective in removing both iron and manganese, as well as lowering organic carbon levels and reducing halogen demand in the water system. However, high capital and operating costs coupled with the risk of aggressive oxidant carry-over make these approaches impractical for many applications. Spray ponds and aeration chambers commonly used to remove iron are not effective in removing manganese due to the much slower kinetics of manganese air-oxidation.

Manganese stabilization, on the other hand, is achieved by using chemicals to interfere with the formation and growth of $MnO_2$ particles. The use of polyphosphate in drinking water systems for this purpose is well established. The formation of a manganese polyphosphate complex inhibits deposition. Threshold inhibitors such as phosphonic acid derivatives are used to maintain particulate $MnO_2$ in a colloidal, more easily dispersed state, by coupling to and preventing growth at active sites on the particle surface. In combination, polymeric dispersants (including polyacrylates and multifunctional copolymers), are used to disperse the colloidal $MnO_2$ and prevent its aggregation and settling.

Halogenation and alkaline pH degrade the effectiveness of the threshold inhibitor/polymeric stabilization technique by increasing the rate of manganese oxidation, and, in the case of halogen, by directly breaking down the inhibitor and dispersant molecules. The effectiveness of the treatments is also diminished by the presence of high levels of hardness, silt, iron, or other suspended solids that compete for both the threshold inhibitor and the dispersant. Further, the level of manganese deposition control provided by phosphonate/polymeric treatments alone has an upper limit, beyond which, increased doses or concentrations of phosphonate/polymer do not result in increased manganese control. The upper limit of effectiveness is particularly problematic in water systems having manganese in a relatively high total amount and/or operating at high cycles of concentration.

The reaction of Mn(II) with chlorine can be accelerated by adsorption of Mn(II) onto the growing $MnO_2$ surface, which acts as a catalyst for further oxidation. This "autocatalytic" effect improves the efficiency of manganese removal systems; however, it adversely affects efforts to stabilize dissolved manganese against oxidation by halogens. $MnO_2$ that forms on surfaces by microbiological oxidation of trace levels of dissolved manganese serves as active material that "seeds" further chemical $MnO_2$ deposition. The seeding can lead to $MnO_2$ deposition under conditions that might not otherwise support chemical manganese oxidation. Accordingly, it is an objective of chemical water treatment to stabilize manganese against oxidation by halogens so that the oxidant can be used to inhibit microbial growth without risking chemical deposition of manganese.

A correlation may exist between the behavior of manganese and the behavior of cerium. For example, the oxidation of manganese in marine waters may be inhibited by the presence of cerium. The observations relate to the formation of manganese dioxide by natural oxidation processes. Cerium has also become the focus of significant corrosion research as a possible, preferred corrosion inhibitor to replace toxic chromium compounds. Neither relate to the inhibition of manganese deposition caused by chemical oxidation. Phosphonic acid derivatives with metal ions, including ceric ions (i.e., cerium in the +4 oxidation state), can be used for corrosion inhibition and scale control in aqueous systems, without specifying the control of manganese, and further, without teaching the use of cerium for protection against the oxidation of manganese by oxidizing chemicals.

Accordingly, a need exists to control chemical oxidation of manganese by halogen compounds that are commonly applied for microbial control and sanitation in aqueous systems. A need also exists to enhance the level of manganese deposition control heretofore provided by widely used deposit control agents. A further need exists to control the degradation of organic additives, such as polymer and phosphonate additives, from exposure to chlorine and other halogen compounds.

SUMMARY OF THE PRESENT INVENTION

It is therefore a feature of the present invention to provide a cerium-containing composition adapted to stabilize manganese against chemical oxidation.

Another feature of the present invention is to provide a cerium-containing composition adapted to increase the effectiveness of deposit control agents in controlling manganese deposition.

A further feature of the present invention is to provide a cerium-containing composition adapted to provide chlorine stabilization.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of controlling manganese deposition in an aqueous system containing manganese, that generally includes introducing an effective amount of at least one cerium-containing formulation to the aqueous system. The method optionally includes using at least one deposit control agent in the aqueous system in addition to the cerium-containing formulation.

The present invention further relates to a cerium-containing composition which includes cerium(III).

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

A method of controlling manganese deposition in an aqueous system containing manganese according to the present invention includes introducing an effective amount of at least one cerium-containing composition to the aqueous system. The method optionally includes using at least one deposit control agent in the aqueous system in addition to the cerium-containing composition.

It is to be understood by "controlling" (i.e., preventing or retarding or minimizing or reducing) manganese deposition, the manganese is stabilized against the growth of insoluble manganese particles. In other words, the formation and/or the growth of manganese dioxide ($MnO_2$) particles is inhibited or slowed. Controlling the growth of $MnO_2$ can include preventing the chemical and/or the microbiological oxidation of soluble divalent manganese into water-insoluble manganese oxides and oxyhydroxides. Chemical oxidation can occur when manganese-containing water is exposed to chemicals, such as halogens, ozone, or other oxidizing agents that are commonly used for disinfection of water; whereas, microbiological oxidation can result from the presence of a wide range of naturally occurring microorganisms in surface and ground water. Also, it is to be understood that controlling manganese deposition can include improving the manganese stabilization performance capabilities of known deposition control agents, such as polymeric dispersants and phosphonic acid inhibitors. Further, it is also to be understood that controlling manganese deposition can include inhibiting the oxidative degradation of polymeric dispersants and phosphonic acid compounds that are widely used in water treatment applications. Thus, controlling manganese deposition in the aqueous systems in which the compositions of the present invention are used, can generally denote the mitigation of any undesirable effects caused by manganese deposition.

The cerium-containing composition can be applied as cerium(III) or cerous salts, formed with inorganic or organic anions. Examples of inorganic cerium compounds include, but are not limited to, cerous nitrate, cerous chloride, cerous bromide, cerous iodide, cerous sulfate, cerous carbonate, cerous ammonium nitrate, and cerous phosphate. Examples of organic cerium compounds include, but are not limited to, cerous acetate, cerous citrate, cerous oxalate, cerous benzoate, cerous octoate, cerous phosphonates, and carboxylic acid salts of cerium, including polymeric carboxylic acids, such as cerous polyacrylate, cerous polymaleate, cerous polysulfonates, cerous phosphinocarboxylates and mixed polymers, including copolymers and terpolymers of carboxylic acid, phosphonic acid, and sulfonic acid functionalities. Examples of such copolymers include, but are not limited to, acrylic acid/2-acrylamido-2-methylpropane sulfonic acid and acrylic acid/sodium-3-allyloxy-2-hydroxypropane sulfonate copolymers. Examples of terpolymers include, but are not limited to, maleic anhydride/ethyl acrylate/vinyl acrylate, acrylic acid/sulfonic acid/acrylamide, and sulfonated phospohonocarboxylic acids.

Any amount effective to inhibit, control, or minimize manganese deposition can be used. An example of an effective amount of at least one cerium-containing composition is from about 0.01 to about 100 ppm, and preferably from about 0.1 to about 10 ppm, and most preferably from about 0.1 to about 2 ppm, in the system being treated.

According to one embodiment of the present invention, the cerium-containing composition can be generated in-situ or extra-situ by chemical or electrochemical reduction of cerium(IV) or ceric compounds; which compounds can include, but are not limited to, inorganic or organic anions and polymeric compounds of the types described above for cerous salts.

The cerium-containing composition of the present invention can be used alone or along with dispersing, deflocculating, or sequestering polymers, and/or with crystal modifying, threshold inhibiting, or chelating agents, which collectively comprise a class of compounds known in the art as "deposit control agents" (DCAs). Table 1 provides a representative list of DCAs that can be used to practice the present invention. It is recognized that monomers of different classes may be combined to form copolymers, terpolymers, and high order polymeric compounds, and as such, the examples of Table 1 are illustrative and are not intended to limit the variety of DCAs that can be used in combination with the cerium-containing composition of the present invention.

With respect to the use of the cerium-containing composition of the present invention along with at least one DCA, the cerium-containing composition and the DCA can be present in the aqueous system in a weight ratio range of from 100:1 to 0.01:1000, and preferably from about 0.01:10, and more preferably 0.1:1. More than one DCA can be used along with the cerium-containing composition, wherein the cerium-containing composition, $DCA_1$, and $DCA_n$ can be present in the aqueous system in a weight ratio range of from 100:1:1 to 0.01:1000:1000, and preferably from about 0.01:10:10, and more preferably 0.1:1:1. According to one embodiment, the cerium-containing composition and a polymer-based deposit control agent are present in the aqueous system in a weight ratio range of from 100:1 to 0.01:1000. According to another embodiment, the cerium-containing composition and a phosphonate-based deposit control agent are present in the aqueous system in a weight ratio range of from 100:01 to 0.01:1000. In a preferred embodiment, the cerium-containing composition, the phosphonate-based deposit control agent, and the polymer-based deposit control agent are present in the aqueous system in a weight ratio of about 1:4:10.

Tables 2-4 describe exemplary formulations comprising at least one DCA and a cerium-containing composition of the present invention. Other amounts and other combinations can be used.

TABLE 2

| Component | grams |
|---|---|
| Phosphinocarboxylate polymer, 50 wt. % active solids, MW 4000, phosphorous content less than 1 wt. % | 10 |
| 2-phosphonobutane, 1,2,4 tricarboxylic acid, 50 wt. % | 6 |
| Cerium chloride solution, 20 wt. % Ce(III) | 2.5 |

TABLE 1

| Class | Individual or repeating monomer unit | Specific Examples |
|---|---|---|
| Polyacrylates | [—CH$_2$C(H)(COOH)—]$_n$ | Sodium polyacrylate, potassium polyacrylate |
| Polyacrylamides | [—CH$_2$C(H)(CON(R1)(R2))—]$_n$ where R1 and R2 refer to organic groups such as those of the alkyl, aryl, ester, alcohol, and carbonyl classes. | polyacrylamide |
| Polymethacrylates | [—CH$_2$C(CH$_3$)(COOH)—]$_n$ | Sodium polymethacrylate |
| Polymaleates | [—CH(COOH)—CH(COOH)—]$_n$ | Polymaleic acid |
| Polyphosphates | Na[(O)P(=O)(ONa)—OP(=O)(ONa)]$_n$—ONa] | Sodium hexametaphosphate |
| Phosphinocarboxylates | [—C(H)(COOH)CH2]$_m$—P(=O)(OH)—[CH$_2$—C(H)(COOH)—]$_n$ | Phosphinocarboxylate copolymer with n = m = 16 |
| Polyacrylamidesulfonates | [CH$_2$CH[(CONH—C(R1)(R2)(R3)SO$_3$H]—)$_n$ where R1, R2, and R3 refer to organic groups such as those of the alkyl, aryl, ester, or alcohol classes | 2-Acrylamido-2-methylpropanesulfonic acid (AMPS) |
| Sulfonated styrene | [—CH(phenylSO$_3$H)—CH—] | Sulfonated styrene-maleic anhydride copolymer |
| Phosphonic acids | [C(R1)(R2)(R3)—P(=O)(OH)$_2$ where R1, R2, and R3 may be hydroxyl, organic, or phosphoric acid groups. | 1-Hydroxyethylidene-1,1-diphosphonic acid (HEDP) |

TABLE 2-continued

| Component | grams |
| --- | --- |
| Water | 81.5 |

TABLE 3

| Component | grams |
| --- | --- |
| AcrylicAcid/Acrylamido-2-methylpropanesulfonic acid, 42 wt. % active solution, MW 4500 | 20.0 |
| 1-Hydroxyethylidene-1,1-diphosphonic acid, 60 wt. % active solution | 8.0 |
| Cerous nitrate-6$H_2$O | 6.2 |
| Water | 65.8 |

TABLE 4

| Component | grams |
| --- | --- |
| Aminotri(methylenephosphonic acid), 50 wt. % active solution | 84.8 |
| Cerium chloride solution, 20 wt. % Ce(III) | 15.2 |

The formulations in Tables 2-4 are preferably present in the aqueous system in an amount of from about 1 to about 1000 ppm, and more preferably from about 10 to about 1000 ppm, and most preferably from about 10 to about 100 ppm. Other concentrations can be used.

The cerium-containing composition can be used to control manganese deposition in any aqueous system in which exposed surfaces may suffer corrosion, reduced flow, loss of flow, clogging, plugging, abrasive wear, sensor degradation, or staining due to manganese fouling. The aqueous system can be any water-containing system including, but not limited to, a cooling water system, a humidifier, a drinking water system, a waste water treatment system, a papermaking water system, a swimming facility, an irrigation system, a livestock watering facility, a fountain, an air scrubber, a pond, a car wash, a bottling facility, a laundry system, recreational water systems, a filtration system, a reverse osmosis system, or a desalinization facility. The aqueous systems can also be any system that comprises nozzles for the distribution of water into fine mist, including dampeners, e.g., eliminator blades to impede the aerosol mist and prevent carryover in air wash systems. The nozzles, screens, filters, valves, and dampeners of systems are particularly subject to fouling by mineral deposits. Such systems typically discharge the water or capture the water for filtration and reuse. The application of the cerium-containing composition to such systems can slow the rate of manganese oxidation so that manganese deposition is reduced or eliminated in the nozzles and/or other areas of reduced/restricted water flow.

The cerium-containing composition can be introduced into the water system as any other water treatment chemical, including as a solid, liquid, or gas, using feeders, pouring in, injecting, dissolving, stirring, aspiration, eduction, and the like. The introducing can be by batch, continuous, semi-continuous, or combinations thereof. With respect to the use of the cerium-containing composition of the present invention along with at least one other DCA, the cerium-containing composition can be introduced into the aqueous system in conjunction with one or more DCAs, sequentially, as a mixture, and/or in addition to an aqueous system in which one or more DCAs are already present. It is further recognized that the aqueous system can also have present other compositions or agents including, but not limited to, colorants, dyes, fillers, builders, sequestrants, perfumes, buffers, antioxidants, surfactants, and chelants, as well as the common components of laundry detergents and laundry aids. For illustrative purposes only, introduction of the cerium-containing composition into a cooling water system is discussed in detail. Application of the cerium-containing composition to other aqueous systems can be achieved by similar or dissimilar techniques of administration of water treatment known in the art.

A cooling water system can introduce makeup water containing manganese into a circulating system where the manganese can precipitate and foul system surfaces, resulting in increased risk of corrosion, loss of heat exchanger efficiency, reduced flow velocity, clogging, plugging, staining, pump damage, degraded sensor performance, reduced chemical treatment performance, and other adverse effects. A circulating cooling water system can comprise tubing, piping, basins, pumps, heat exchangers, valves, manifolds, sensors, and other hydraulic components that can experience damage or reduced performance as a result of manganese fouling. In addition to the hydraulic components, open recirculating cooling water systems can utilize cooling towers, spray ponds, cooling ponds, or other open reservoirs to extract heat by the evaporation of water. Open recirculating systems can employ fans, spray nozzles, distribution channels, drift eliminators, louvers, fill material, wire, mesh, weirs, structural support members and other components that are subject to damage or deterioration by manganese deposition.

To reduce or eliminate the adverse effects of manganese fouling in cooling systems, the cerium-containing composition alone, or in conjunction with other DCAs can be added to the makeup water stream and/or to the circulating water system. A preferred point of addition of the cerium-containing composition is the makeup water stream at a point sufficiently far upstream that the additive and makeup water are sufficiently mixed before the water enters the circulating system. For example, well-water is a common source of manganese in cooling systems. Low pH and low levels of dissolved oxygen in the well water sustain elevated levels of dissolved manganese. When such waters enter an open cooling water system, oxygen levels can increase and pH can rise due, in part, to degassing of dissolved carbon dioxide, resulting in conditions favorable to the oxidation of dissolved manganese into insoluble manganese dioxide. Further, chlorine used for microbiological control within the circulating cooling system accelerates manganese oxidation. Introducing the cerium-containing composition and optionally other DCAs (collectively, "additives" or "inhibitors") into the makeup water prior to entering the circulating system can ensure that the additives and makeup water are thoroughly mixed to optimize the inhibiting effect of the additives on manganese oxidation and its deposition. However, the composition can be introduced at any point or multiple points and still be effective.

Cooling water systems typically use chlorine or other oxidizing microbicides intermittently at more concentrated dosages to achieve a threshold level of oxidizer for microbial control. This method of delivery, referred to as "shock" treatment, periodically exposes manganese to more aggressively oxidizing conditions. To maximize the inhibiting effect of the cerium-containing composition or cerium-containing composition/DCA combinations, it is preferable to synchronize the cerium-containing composition or the additives with the timing of the shock treatment to provide maximum concentrations of inhibitor during the periods of most aggressive manganese oxidation. Synchronization can be achieved by introducing the additives to the circulating water system immediately before the oxidizer is added to allow sufficient time for the circulating water to be sufficiently mixed with additives before the stream is exposed to the oxidizer. A preferable point of addition is the cooling tower return line, such that the additives and cooling water are sufficiently mixed by processes of advection, diffusion, and/or physical agitation that occur within the cooling tower. Loss of additives through degradation or through system blowdown, offsets the periodically elevated inhibitor dosage so that a desired average daily dosage of the treatment of the present invention can be maintained. The cerium-containing composition or additives feed can be synchronized with oxidizer addition through any means of synchronization including electronic timers, automated process control, or manual addition.

The previously described versions of the present invention have many advantages, including reduced problems associated with manganese deposition in water systems. Cerium-containing compositions of the present invention specifically inhibit the oxidation of manganese by chlorine. In addition, use of the cerium-containing compositions with polymer treatment, and with phosphonate plus polymer treatment, provides superior manganese deposition inhibition to that provided by the DCA treatments without the cerium-containing compositions. The increase in total manganese deposition inhibition is significant given the fact that the upper limit of control has previously not been able to prevent manganese deposition in cooling water systems containing high levels of manganese or operating at high cycles of concentration.

Degradation of organic additives by exposure to chlorine and other halogens introduces a significant cost to industrial water treatment. The cerium-containing compositions protect polymer and phosphonate additives against degradation by chlorine ("chlorine stabilization"). Treatment is effective at sub-ppm cerium dosage and is competitive with alternative approaches that require the use of specific halogen stable additives to provide inhibition. In addition, chlorine stabilization allows the use of standard, proven phosphonate and polymer additives, avoiding the need to rely on a limited selection of less well established, halogen stable alternatives. The compositions and treatments of the present invention can further provide chlorine stabilization of organic laundry aids including dyes, colorants, builders, sequestrants, perfumes, buffers, antioxidants, or surfactants in an aqueous system when introduced at an effective amount to the aqueous system.

The present invention will be further clarified by the following examples, which are intended to be exemplary of the present invention.

EXAMPLES

The performance of a treatment according to the present invention to control manganese deposition in an aqueous system can be evaluated by exposing Mn(II)-containing solutions to conditions that cause $MnO_2$ to form, and then determining the amount of dissolved manganese remaining after insoluble $MnO_2$ has been removed from the solution, by filtration through a sub-micron filter. Manganese in the filtrate is either dissolved or in a finely divided, easily dispersed state that does not precipitate as readily as the coarser material. Higher levels of manganese in the filtrate correspond to improved inhibition of manganese deposition.

Cerium Inhibition of Manganese Oxidation by Chlorine

To assess the ability of cerium to inhibit manganese oxidation by chlorine, an aqueous solution containing soluble divalent manganese and sodium hypochlorite was allowed to incubate for periods up to 24 hours. The aqueous solution was then passed through a 0.2 micron filter and manganese in the filtrate was measured. Solutions containing cerium were run under identical conditions with the cerous salt added prior to the addition of hypochlorite. Inhibition was calculated based on the manganese residual in the treated and in the control solutions, according to Equation 1:

$$\% \text{ inhibition} = (Mn_{treated} - Mn_{control})/(Mn_{initial} - Mn_{control}) \times 100 \quad \text{(Eq. 1)}$$

Where $Mn_{initial}$=dissolved manganese present at the start of the exposure. Chlorine inhibition is calculated in a similar manner based on initial and residual chlorine concentrations.

Experimental Conditions—Water for the tests was prepared by dissolving 1.76 g $CaCl_2$-$2H_2O$, 0.74 g $MgSO_4$-$7H_2O$, 1.34 g $NaHCO_3$, and 0.71 g $Na_2SiO_3$-$5H_2O$ in 4 liters of dimineralized water containing 3.3 ml of 6N $H_2SO_4$, followed by aeration to equilibrium with the atmosphere, to produce an aqueous solution at pH 7.5-8 containing 300 ppm Ca (as $CaCO_3$), 75 ppm Mg (as $CaCO_3$), and 50 ppm $SiO_2$.

Stock solutions of chemical additives were prepared as follows:
1) Stock Mn(II) solution, 1 mg/ml: Add 0.308 g $MnSO_4$-$H_2O$ to demineralized water and make to 100 ml.
2) Stock hypochlorite solution, 1 mg/ml: Add 2.0 ml of 5% commercial bleach to demineralized water and make to 100 ml.
3) Stock hypobromite solution: 4.5 mg/ml: Add 2.0 ml of 5% commercial bleach plus 0.36 g of 40 wt % NaBr solution to demineralized water and make to 100 ml.
4) Stock Cerium(III) solution, 1.0 mg/ml: Add 0.25 g $Ce_2(SO_4)3$-$8H_2O$ to demineralized water, dissolve and make to 100 ml.
5) Stock 2000 polymer, 10 mg/ml: Add 2.5 g of 42% active commercial poly (2-acrylamido-2-methylpropanesulfonic acid) to approximately 80 ml of demineralized water, adjust pH to 8.0 using sodium hydroxide solution and make to 100 ml.
6) Stock 3100 polymer, 10 mg/ml: Add 2.5 g 42% active acrylic acid/sulfonic acid/nonionic terpolymer to approximately 80 ml of demineralized water, adjust pH to 8.0 using sodium hydroxide solution and make to 100 ml.
7) Stock 400 polymer, 10 mg/ml: Add 2.5 g 42% active phosphino-sulfonated acrylate polymer to approximately 80 ml of demineralized water, adjust pH to 8.0 using sodium hydroxide solution and make to 100 ml.
8) Stock 1-Hydroxyethylidene-1,1diphosphonic (HEDP) solution, 10 mg/ml: Add 1.67 g of 60% active commercial HEDP to approximately 80 ml of demineralized water, adjust pH to 8.0 using sodium hydroxide solution and make to 100 ml.
9) Stock 2-Phosphonobutane-1,2,4-tricarboxylic acid (PBTC) solution, 10 mg/ml: Add 2.00 g of 50% active commercial PBTC to approximately 80 ml of demineralized water, adjust pH to 8.0 using sodium hydroxide solution and make to 100 ml.

Figure 1:
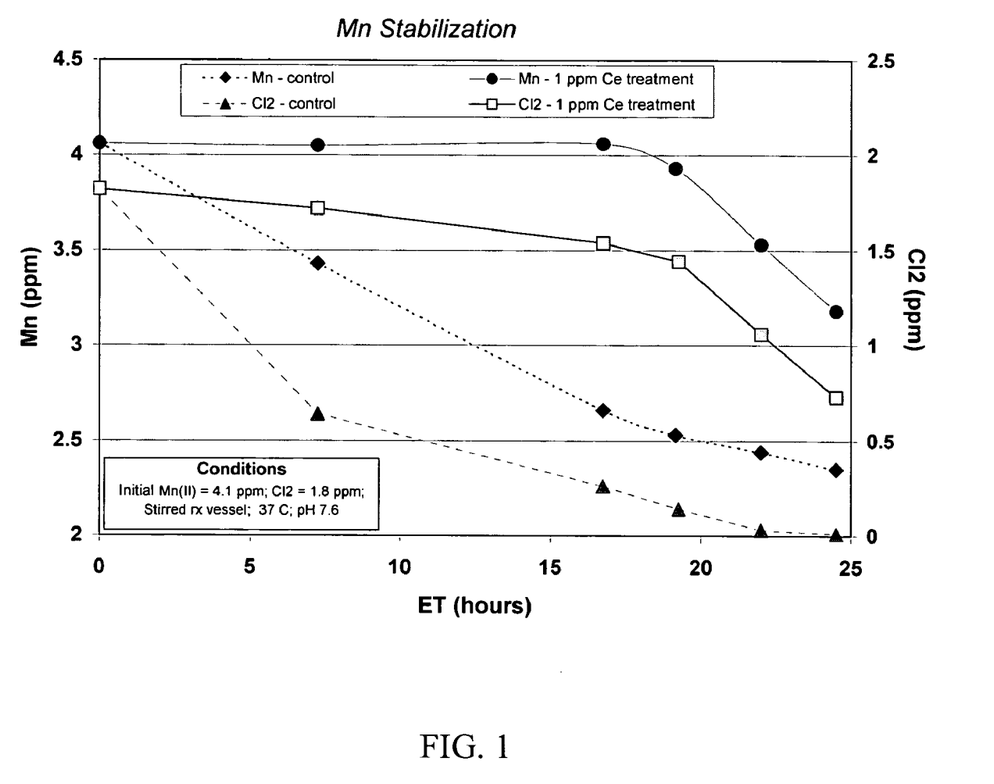
FIG. 1 is a graph representing manganese stabilization tests showing manganese and chlorine concentrations after initial cerium addition to an aqueous system as a function of time.

Time Dependence of Cerium Inhibition—An initial test to measure the extent and persistence of manganese stabilization provided by 1 ppm Ce(III) was conducted by adding, in order, 500 ml test water, 0.5 ml of 1 mg/ml cerium stock, 2 ml of 1 mg/ml Mn(II) stock solution, and 1 ml of 1 mg/ml hypochlorite stock solution to a glass beaker. An untreated control was prepared in identical fashion without the cerium inhibitor. Both solutions were heated at 37° C. and stirred at 300 rpm using a regulated stirrer-hotplate. At specified times over a 24 hour period, samples of the solutions were withdrawn, filtered, and analyzed for Mn(II) and for free available chlorine using commercial colorimetric test procedures. The time-dependent inhibition of manganese oxidation by cerium is shown in FIG. 1 with data listed in the table below.

| Manganese and Chlorine Time-Dependant Inhibition Test Results 1 ppm Cerium treatment 500 ml stirred Test Water, 37 C, pH 7.6. Initial Conditions: Mn = 4.1 ppm, $Cl_2$ = 1.8 ppm | | |
|---|---|---|
| | % inhibition | |
| Elapsed Time (hr) | Mn | Free $Cl_2$ |
| 7.3 | 98.4 | 79.4 |
| 16.8 | 100.0 | 73.6 |
| 19.2 | 91.5 | 69.9 |
| 22.0 | 67.3 | 52.3 |
| 24.5 | 48.5 | 36.2 |

The results for treatment with Ce(III) at 1 ppm indicate that 100% of the initial manganese remained soluble after 17 hours. A significant stabilization of free chlorine during the same period was also achieved. By comparison, dissolved manganese in the untreated sample decreased to 85% and to 65% of the initial amount after 7 and 17 hours, respectively, as shown in FIG. 1. The mole ratio of manganese loss to chlorine loss for the control solution after 17 hours was between 0.9 and 1, consistent with the established stoichiometry for the reaction of Mn(II) with chlorine:

$$2H_2O + Cl_2 + Mn^{+2} \rightarrow MnO_2(s) + 2Cl^- + 4H^+ \quad (Eq. 2)$$

At 17 hours, the control solution contained dark brown suspended and particulate $MnO_2$, whereas the solution treated with 1 ppm cerium was clear and colorless, indicating that $MnO_2$ was not formed in the treated solution. After 17 hours, Mn(II) and chlorine began to decrease in the treated solution, however inhibition remained above 50% up to 24 hours.

Effect of Cerium Dosage—To determine the effect of varying cerium dosages on manganese oxidation by chlorine, tests were conducted at cerium concentrations ranging from 0 to 2 ppm in stirred beakers as described for the time-dependence tests described above. Filtered manganese was measured after 17 hours. Data for the dose response tests, shown in FIG. 2 and the table below, indicates that cerium provides inhibition at concentrations as low as 0.2 ppm, and provides a maximum effect near about 1 ppm. Substantial inhibition is maintained throughout the higher dosage range.

Figure 2:
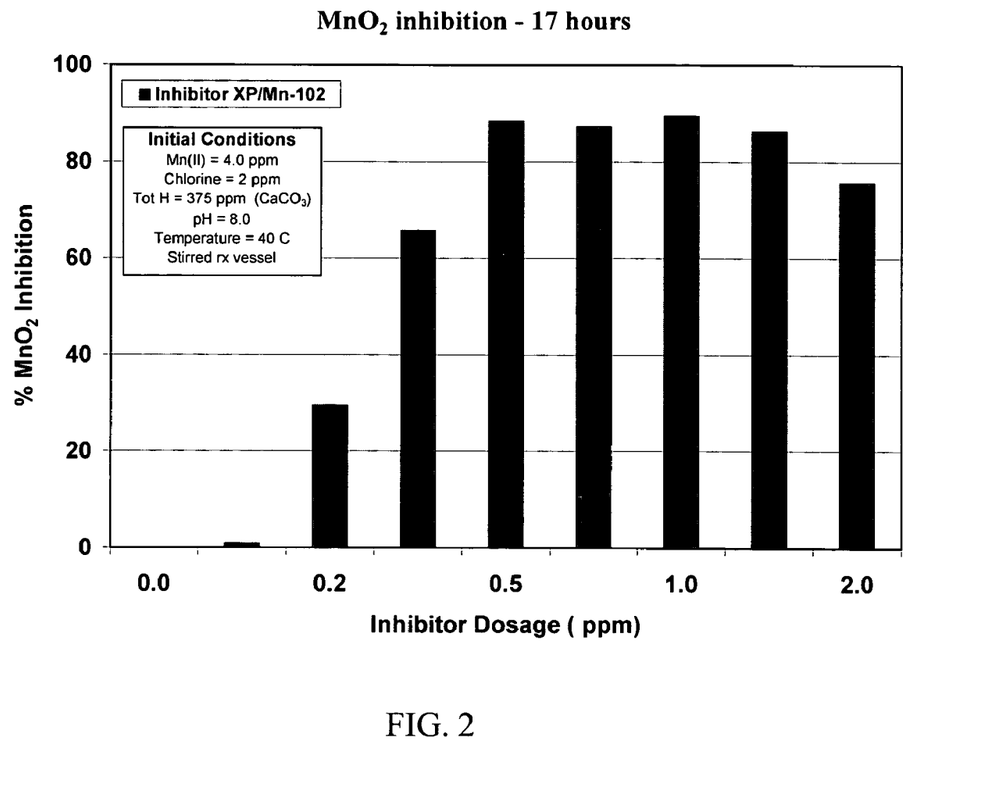
FIG. 2 is a graph representing manganese stabilization tests showing manganese inhibition as a function of cerium level in an aqueous system.

| Manganese and Chloride Dose Dependent Inhibition Test Results Initial Concentrations: Mn(II) = 4.07 ppm; chlorine = 2.0 ppm | | |
|---|---|---|
| Initial Ce(III) (ppm) | Filtered Mn @ 17 hours (ppm) | % Mn inhibition @ 17 hours |
| 0 | 2.29 | 0.0 |
| 0.10 | 2.22 | -3.7 |
| 0.20 | 2.82 | 29.6 |
| 0.38 | 3.45 | 65.4 |
| 0.50 | 3.82 | 85.8 |
| 0.75 | 3.81 | 85.2 |
| 1.0 | 3.93 | 92.0 |
| 1.5 | 3.75 | 82.1 |
| 2.0 | 3.60 | 73.5 |

Mechanism of Manganese Inhibition by Cerium—Manganese dioxide is a highly surface-active material used in a broad range of industrial applications. The industrial applications include use as a scavenger to bind metallic cations, and as a surface catalyst to mediate reactions such as the oxidation of As(III) and Se(IV) that have utility in environmental remediation. Ce(III) displays a high affinity for surfaces, and dissolved Ce(III) can be expected to adsorb readily onto hydrous $MnO_2$. Cerium exhibits redox chemistry involving the +3 and +4 oxidation state that can potentially enable Ce(III) to take part in redox reactions with both manganese dioxide and chlorine. While strict thermodynamic analysis indicates that Ce(III) is stable with respect to oxidation by $MnO_2$ and chlorine under the concentration and pH conditions used in the present testing, surface energetics of Ce(III) adsorbed on freshly formed hydrous manganese oxides may cause the redox behavior to deviate significantly from the theoretical. Oxidation of Ce(III) by chlorine constitutes a competitive reaction that would diminish the amount of chlorine available to react with Mn(II). Alternatively, oxidation of Ce(III) by $MnO_2$ might appear to provide inhibition by directly regenerating Mn(II).

The direct consumption of chlorine by reaction with Ce(III) was investigated by comparing chlorine loss in sealed glass jars initially containing 1.7 ppm chlorine, with and without 0.5 ppm Ce(III). After 18 hours exposure, the final chlorine concentrations in the two solutions was identical at 1.2 ppm. This finding indicates that inhibition of manganese oxidation does not result from the direct consumption of chlorine by cerium in solution. Stoichiometric analysis based on the Mn(II) remaining after 17 hours for the 1 ppm Ce treatment compared to the untreated control indicates that less than 15% of the difference in Mn(II) between the two solutions could have resulted from reduction of $MnO_2$ by Ce(III). Thus it appears unlikely that Ce(III) inhibits Mn(II) oxidation by direct consumption or regeneration of reactants. Instead, it is possible that adsorbed Ce(III) retards $MnO_2$ formation by interfering with the growth of the $MnO_2$ particles. This effect may result from competition between Ce(III) and Mn(II) for sites on the nucleating $MnO_2$ particle that interferes with the 'autocatalytic' oxidation. Alternatively, or perhaps additionally, adsorption of Ce(III) may interfere with particle growth by distorting the $MnO_2$ lattice. This mode of inhibition, in which substoichiometric amounts of adsorbed material retard particle growth, is a widely recognized phenomenon termed, a threshold effect, in cooling water treatment.

Cerium Enhances the Performance of Dispersants in Inhibiting Manganese Oxidation by Chlorine—Deposition of bulk phase particulate material in aqueous systems is often controlled by using highly charged polymers to electrostatically couple to finely divided suspended material; thereby increasing the particle charge and preventing aggregation. Polymers that incorporate sulfonic acid groups on the polymer backbone are especially effective in inhibiting the formation of iron and manganese particulates. The carboxylic and sulfonic acid groups in these molecules sequester dissolved iron and manganese as well as affording a highly polarizable charge that enhances dispersion. Threshold inhibiting agents such as phosphonic acid salts are commonly applied together with dispersing polymers to provide inhibition that exceeds the capabilities of either inhibitor used alone. Combined phosphonate/polymer chemistry is a mainstay for manganese control in the water treatment industry.

Sealed Jar Test Procedure—A series of tests were conducted to evaluate 1) the effect of cerium on the manganese inhibition afforded by polymer/phosphonate chemistry and 2) to evaluate the effect of cerium on the degradation of polymer/phosphonate chemistry by halogen compounds. These tests were conducted in sealed glass jars containing various combinations of test solution, polymer, phosphonate, manganese, hypochlorite, hypobromite, and cerium. For the sealed-jar determinations, 100 ml of test water was added to 4-ounce glass jars, followed by the addition of appropriate volumes of stock solutions of polymer, phosphonate, Ce(III), Mn(II), sodium hypochlorite, and/or sodium hypobromite to give target initial concentrations. The jars were tightly capped and placed in an oven heated to a temperature of 53° C. After 17 hours, the solutions were removed from the oven, filtered through a 0.2 μm filter, and analyzed for Mn(II) and/or free available halogen as indicated in the following tests.

Cerium/Polymer Tests—The use of cerium in combination with dispersing polymers was examined to determine if the two distinct chemistries would provide greater manganese inhibition than the polymer alone. Tests were conducted using the sealed jar method described above. Three commercial polymers were tested alone and in combination with 0.5 ppm Ce(III). Product 2000 is acrylic acid/2-acrylamido-methylpropane sulfonic acid copolymer; Product 3100 is an acrylic acid/sulfonic acid/non-ionic terpolymer; and Product 400 is an acrylic acid/acrylamidosulfonic acid copolymer containing phosphino groups along the polymer backbone. Mn and sodium hypochlorite stock solutions were added to give initially 4 ppm Mn(II) and 1.8 ppm free chlorine at pH 7.8. Each test was run in duplicate and the results of the duplicate values were averaged. The table below shows the enhanced manganese inhibition that results when 0.5 ppm Ce(III) is added to the three types of sulfonic functional polymeric inhibitors.

| Polymer | Dose (ppm active) | Ce(III) (ppm) | Mn Inhibition (%) |
| --- | --- | --- | --- |
| 2000 | 6 | none | 68.3 |
| 2000 | 6 | 0.5 | 92.6 |
| 3100 | 6 | none | 66.8 |
| 3100 | 6 | 0.5 | 78.1 |
| 400 | 6 | none | 52.9 |
| 400 | 6 | 0.5 | 85.6 |

Field Trial Performance—The performance of cerium in stabilizing manganese was further evaluated in a field trial at a mid-western U.S. electric utility station. The plant employs a polymer/phosphonate program for inorganic deposit control in the cooling water system. Cerium was added as an overlay to the existing chemical treatment program to determine the effect on bulkwater manganese concentrations. Details of the field site and trial protocol follow.

The utility station generates power through a single, 235 MW, coal fired, steam turbine-generator. Under average electrical loads, the cooling system operates at 135,000 gallons per minute (gpm) recirculation; 2,500 gpm evaporation; and 1140 gpm blowdown resulting in a flow rate of 8 ft/s and a temperature rise of 20° F. across the surface condenser tubes.

Makeup water supplied from local wells is used to cool the shell-and-tube surface condenser and other heat exchangers in the cooling water system. The well water typically contains approximately 1 ppm manganese and 3 ppm iron as well as calcium, magnesium, silica and other dissolved solids. Evaporation in the utility cooling tower increases the dissolved solids concentration 3 to 4 fold resulting in severe inorganic fouling conditions. The extent of this evaporative effect—known in the water treatment industry as cycles-of-concentration (COC)—can vary due to variations in temperature, humidity, bulkwater discharge rates, and other factors. Total dissolved solids or conductivity are typically used to control makeup and discharge rates to maintain a desired COC in the system.

To control inorganic deposition in the cooling water system, a chemical treatment program consisting of 5 ppm active polymer 3100, and 4 ppm active HEDP is used. Despite treatment, the bulkwater manganese concentration rarely exceeded 1.1 ppm, indicating that manganese was being removed by deposition within the cooling system.

To reduce manganese loss at the utility, a trial was executed in which cerium was introduced as an overlay to the existing cooling water program. Cerium was added based on the 2.5 million-gallon cooling system volume to initially charge the system to 0.6 ppm cerium. Cerium was then fed continuously for three days to maintain the target dosage of 0.6 ppm. After three days, additional cerium was introduced to increase the dosage to 0.8 ppm and 1 ppm additional HEDP was added. Manganese and conductivity in the makeup water and bulkwater were measured twice daily throughout the test. The test data was used to correct the measured manganese for variations in COC by comparing the COC of manganese with the COC for conductivity. The following formula incorporates the correction to calculate the percent increase in bulkwater manganese at various times following cerium addition.

$$[((Mn_{bulk}/Mn_{makeup})/(Cond_{bulk}/Cond_{makeup})-(Mn_{bulk,t=0}/Mn_{makeup,t=0})/(Cond_{bulk,t=0}/Cond_{makeup,t=0}))/(Mn_{bulk,t=0}/Mn_{makeup,t=0}/(Cond_{bulk,t=0}/Cond_{makeup,t=0})]*100$$

Where:
$Mn_{bulk}$=Manganese concentration in the bulkwater;
$Mn_{makeup}$=Manganese concentration in the makeup water;
$Mn_{bulk,t=0}$=Manganese concentration in the bulkwater before cerium addition;
$Mn_{makeup,t=0}$=Manganese concentration in the makeup water before cerium addition;
$Cond_{bulk}$=Conductivity in the bulkwater;
$Cond_{makeup}$=Conductivity in the makeup water;
$Cond_{bulk,t=0}$=Conductivity in the bulkwater before cerium addition; and
$Cond_{makeup,t=0}$=Conductivity in the makeup before cerium addition.

Manganese was measured on both unfiltered samples and on samples that had passed a 0.22 micron filter. Results of the unfiltered Mn measurements indicate the total bulkwater Mn concentration, which includes dissolved Mn(II) as well as suspended MnO$_2$. Results of the filtered measurements indicate the dissolved Mn(II) plus colloidal MnO$_2$ that was able to pass through the filter.

Figure 3:
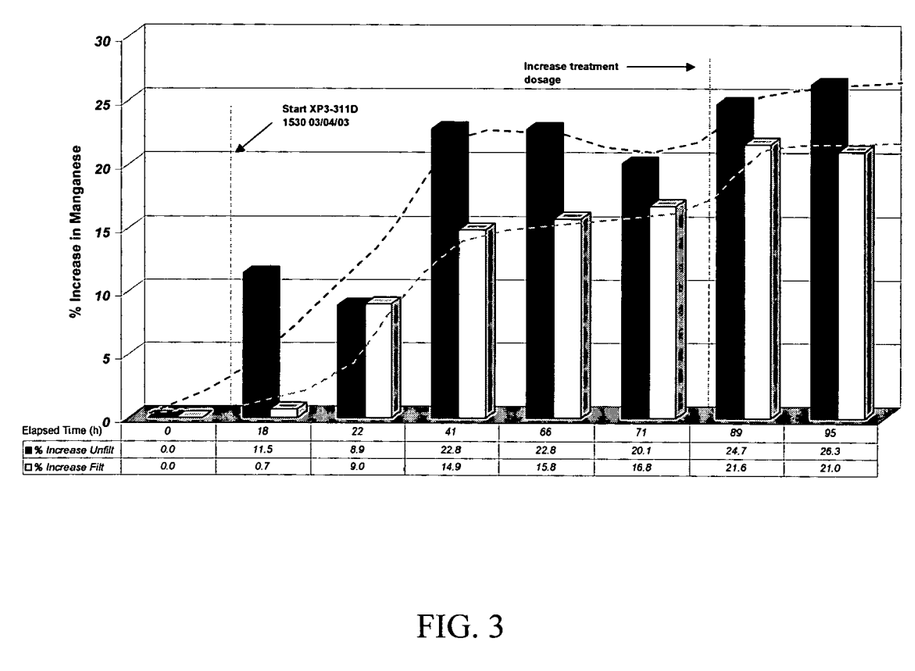
FIG. 3 is a graph representing manganese stabilization tests in a utility cooling water trial showing increased manganese percentages as a function of time.

FIG. 3 shows the increase in manganese that developed in the recirculating cooling water in response to cerium addition. Total bulkwater (unfiltered) manganese increased slightly more than 10% within 18 hours of product addition, and stabilized at approximately 20% increase over the following two days. Increasing cerium dosage to 0.8 ppm combined with additional phosphonate further increased manganese to approximately 25% above the pre-trial value. Trends for dissolved (filtered) manganese were similar. Overall, the trial results indicate that cerium significantly enhances manganese stability in industrial cooling water.

Cerium Inhibits the Degradation of Polymer and Phosphonate Compounds by Chlorine—A critical factor in the selection of polymers and phosphonates for water treatment applications is stability of the compounds to degradation by halogen compounds, particularly chlorine and bromine, that are routinely use for disinfection and microbiological control in water systems. Reaction of halogens with organic polymers and phosphonates degrades the performance of the polymers and reduces the efficacy of the halogen antimicrobial treatments. It has been discovered that cerium reduces the halogen degradation of phosphonate and polymer compounds.

Cerium Stabilization against Halogen Degradation—The use of cerium to inhibit the degradation of polymer and phosphonate compounds by halogen was investigated using the sealed glass jars tests described above. The solutions in the tests did not contain manganese. In the first of the tests, the "bromine demand" of the phosphonate compounds HEDP and PBTC was evaluated at three concentrations in the presence and absence of cerium. Bromine was added as sodium hypobromite at an initial concentration of 4.5 ppm as free Br$_2$. Each solution also contained 5 ppm active polymer 2000. Br$_2$ was measured after exposure to determine the residual bromine in each solution. Percent increase in residual bromine was calculated according to the formula:

% Increase in Br$_2$=((Final Br$_2$ with Ce−Final Br$_2$ without Ce)/Final Br$_2$ without Ce)*100

The results reported in the table below are the average of duplicate measurements and include identically prepared control solutions which did not contain phosphonate.

| Phosphonate | Dose (ppm active) | Ce(III) (ppm) | Final Br$_2$ (ppm) | Increase in Br$_2$ (%) |
|---|---|---|---|---|
| Control | none | none | 3.21 | |
| Control | none | 0.5 | 3.10 | −3.4 |
| PBTC | 2 | none | 2.38 | |
| PBTC | 2 | 0.5 | 2.66 | 11.8 |
| PBTC | 4 | none | 1.93 | |
| PBTC | 4 | 0.5 | 2.29 | 18.7 |
| PBTC | 6 | none | 1.54 | |
| PBTC | 6 | 0.5 | 1.89 | 22.7 |
| HEDP | 2 | none | 0.69 | |
| HEDP | 2 | 0.5 | 0.92 | 33.3 |
| HEDP | 4 | none | 0.01 | |
| HEDP | 4 | 0.5 | 0.02 | |
| HEDP | 6 | none | 0.02 | |
| HEDP | 6 | 0.5 | 0.05 | |

The test results above indicate that 0.5 ppm Ce(III) increases the final bromine concentration by 10% to more than 30% compared to cerium-free solutions and is particularly effective in stabilizing HEDP. The degradation of HEDP by bromine is a known shortcoming of the use of this phosphonate in water systems that would be at least partly overcome by concurrent use of cerium. The bromine demand for HEDP concentrations of 4 and 6 ppm was so large that negligible residual bromine was measured even in the presence of cerium. Identical sealed glass jar tests initially combining 6 ppm HEDP, 5 ppm active polymer 3100, and 4.5 ppm Br$_2$, indicated that HEDP concentration decreased by 40-50% and bromine decreased to zero during the exposure. The result affirms the degradation of both phosphonate and bromine when these two compounds are allowed to react.

The effect of cerium on the degradation of a combined solution of polymer 2000 and PBTC by chlorine was also tested using the same sealed glass jar conditions. In the test, 2 ppm active PBTC and 5 ppm active polymer 2000 were exposed to 1.6 ppm initial free chlorine in the presence and absence of 0.5 ppm cerium. Averaged results of triplicate runs again shows the effect of cerium in reducing the halogen demand exerted by phosphonate/polymer treatments:

| PBTC (ppm active) | Polymer 2000 (ppm active) | Ce(III) (ppm) | Loss of Cl$_2$ (ppm) |
|---|---|---|---|
| none | none | none | 0.41 |
| 2 | 5 | 0.5 | 0.45 |
| 2 | 5 | none | 0.62 |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of controlling manganese deposition in an aqueous system containing manganese, comprising introducing an effective amount of at least one cerium-containing composition including cerium(III) to said aqueous system to stabilize said manganese against oxidation.

2. The method of claim 1, wherein said cerium-containing composition is a cerium(III) salt.

3. The method of claim 1, wherein said manganese deposition is a result of at least chemical oxidation.

4. The method of claim 1, wherein said manganese deposition is a result of at least halogen oxidation.

5. The method of claim 1, wherein said aqueous system is a cooling water system, a drinking water system, a waste water treatment system, a papermaking water system, a swimming facility, an irrigation system, a livestock watering facility, a humidifier, a fountain, an air scrubber, a car wash, a bottling facility, a laundry system, a filtration system, a reverse osmosis system, or a desalinization facility.

6. The method of claim 1, wherein said cerium-containing composition is an inorganic cerium compound.

7. The method of claim 1, wherein said cerium-containing composition is an organic cerium compound.

8. The method of claim 1, wherein introducing said cerium-containing composition comprises generating said cerium-containing composition in-situ, extra-situ, or both in said aqueous system by chemical reduction, electrochemical reduction, or both of a cerium(IV) compound.

9. The method of claim 1, wherein said effective amount of said cerium-containing composition is from about 0.01 to about 100 ppm.

10. The method of claim 1, further comprising introducing at least one deposit control agent to said aqueous system.

11. The method of claim 1, further comprising introducing at least one polymer-based deposit control agent to said aqueous system.

12. The method of claim 11, wherein said cerium-containing composition and said polymer-based deposit control agent are present in said aqueous system in a weight ratio range of from 100:1 to 0.01:1000.

13. The method of claim 1, further comprising introducing at least one phosphonate-based deposit control agent to said aqueous system.

14. The method of claim 13, wherein said cerium-containing composition and said phosphonate-based deposit control agent are present in said aqueous system in a weight ratio range of from 100:1 to 0.01:1000.

15. The method of claim 1, further comprising introducing at least one polymer-based deposit control agent, and at least one phosphonate-based deposit control agent to said aqueous system.

16. The method of claim 15, wherein said cerium-containing composition, said phosphonate-based deposit control agent, and said polymer-based deposit control agent are present in said aqueous system in a ratio of about 1:4:10.

* * * * *